United States Patent
Zhang et al.

(10) Patent No.: US 10,175,743 B2
(45) Date of Patent: Jan. 8, 2019

(54) POWER SUPPLY CONTROL APPARATUS AND METHOD FOR CONTROLLING POWER SUPPLY

(71) Applicant: Huawei Technologies Co., Ltd., Shenzhen (CN)

(72) Inventors: Xiaofei Zhang, Shenzhen (CN); Huiming Zhong, Shenzhen (CN); Jianjun Teng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 208 days.

(21) Appl. No.: 15/339,113

(22) Filed: Oct. 31, 2016

(65) Prior Publication Data

US 2017/0045931 A1 Feb. 16, 2017

Related U.S. Application Data

(63) Continuation of application No. PCT/CN2015/087309, filed on Aug. 18, 2015.

(30) Foreign Application Priority Data

Jan. 20, 2015 (CN) .......................... 2015 1 0027924

(51) Int. Cl.
  *G06F 1/26* (2006.01)
  *G06F 1/32* (2006.01)
  (Continued)

(52) U.S. Cl.
  CPC ............ *G06F 1/3287* (2013.01); *G06F 1/266* (2013.01); *G06F 1/28* (2013.01); *G06F 1/3209* (2013.01);
  (Continued)

(58) Field of Classification Search
  CPC ................................ G06F 1/266; G06F 1/3209
  See application file for complete search history.

(56) References Cited

U.S. PATENT DOCUMENTS

| 2008/0098250 A1 | 4/2008 | Yamazaki et al. |
| 2010/0280774 A1* | 11/2010 | Ewing ...................... H04Q 9/00 |
| | | 702/60 |

(Continued)

FOREIGN PATENT DOCUMENTS

| CN | 1453918 A | 11/2003 |
| CN | 2783580 Y | 5/2006 |

(Continued)

OTHER PUBLICATIONS

Machine Translation and Abstract of Chinese Publication No. CN2783580, May 24, 2006, 2 pages.
(Continued)

*Primary Examiner* — Albert Wang
(74) *Attorney, Agent, or Firm* — Conley Rose, P.C.

(57) ABSTRACT

A power supply control apparatus, where the power supply control apparatus is configured to control power supply to a cabinet in a data center is presented, where the power supply control apparatus includes a communications module configured to receive an instruction of a network management center, and a controllable switch configured to adjust a capacity of the controllable switch according to the instruction to perform power-on/power-off control on the cabinet. In various embodiments, a power supply control apparatus may receive an instruction of a network management center, and can adjust a capacity of a controllable switch according to the instruction, which enhances power distribution flexibility, and therefore, a workload of changing a switch and a power cable can be reduced, and an engineering related risk can be avoided.

11 Claims, 3 Drawing Sheets

(51) Int. Cl.
*G06F 1/28* (2006.01)
*G06F 11/30* (2006.01)
*H02J 3/14* (2006.01)
*H02J 13/00* (2006.01)
*H02J 9/06* (2006.01)

(52) U.S. Cl.
CPC ...... *G06F 11/3058* (2013.01); *G06F 11/3062* (2013.01); *G06F 11/3089* (2013.01); *H02J 3/14* (2013.01); *H02J 13/0062* (2013.01); *H02J 9/062* (2013.01); *H02J 2003/143* (2013.01); *Y02A 30/62* (2018.01); *Y02B 70/3225* (2013.01); *Y02B 70/3266* (2013.01); *Y02B 90/222* (2013.01); *Y02B 90/226* (2013.01); *Y02B 90/2638* (2013.01); *Y04S 20/12* (2013.01); *Y04S 20/16* (2013.01); *Y04S 20/222* (2013.01); *Y04S 20/242* (2013.01); *Y04S 40/124* (2013.01)

(56) References Cited

U.S. PATENT DOCUMENTS

| | | | |
|---|---|---|---|
| 2010/0328849 | A1 | 12/2010 | Ewing et al. |
| 2011/0148194 | A1* | 6/2011 | Lai ................. H02J 7/0055 307/23 |
| 2013/0253861 | A1 | 9/2013 | Nicholson et al. |
| 2016/0147285 | A1* | 5/2016 | Alshinnawi ........... G06F 1/3287 713/324 |

FOREIGN PATENT DOCUMENTS

| | | |
|---|---|---|
| CN | 101814753 A | 8/2010 |
| CN | 102520783 A | 6/2012 |
| CN | 104600698 A | 5/2015 |

OTHER PUBLICATIONS

Machine Translation and Abstract of Chinese Publication No. CN101814753, Aug. 25, 2010, 3 pages.
Machine Translation and Abstract of Chinese Publication No. CN102520783, Jun. 27, 2012, 4 pages.
Machine Translation and Abstract of Chinese Publication No. CN104600698, Part 1, May 6, 2015, 5 pages.
Machine Translation and Abstract of Chinese Publication No. CN104600698, Part 2, May 6, 2015, 2 pages.
Foreign Communication From a Counterpart Application, Chinese Application No. 2015100279245, Chinese Search Report dated Apr. 14, 2016, 2 pages.
Foreign Communication From a Counterpart Application, European Application No. 15878552.7, Extended European Search Report dated Mar. 1, 2017, 7 pages.
Foreign Communication From a Counterpart Application, Chinese Application No. 201510027924.5, Chinese Office Action dated May 27, 2016, 6 pages.
Foreign Communication From a Counterpart Application, PCT Application No. PCT/CN2015/087309, English Translation of International Search Report dated Nov. 13, 2015, 2 pages.

\* cited by examiner

POWER SUPPLY CONTROL APPARATUS AND METHOD FOR CONTROLLING POWER SUPPLY

CROSS-REFERENCE TO RELATED APPLICATIONS

This application is a continuation of International Application No. PCT/CN2015/087309, filed on Aug. 18, 2015, which claims priority to Chinese Patent Application No. 201510027924.5, filed on Jan. 20, 2015, both of which are hereby incorporated by reference in their entireties.

TECHNICAL FIELD

Embodiments of the present disclosure relate to the field of power supply and distribution in a data center, and more specifically, to a power supply control apparatus and a method for controlling power supply.

BACKGROUND

Power distribution of an information technology (IT) cabinet located in a data center is generally as follows: dual mains power supply is connected, and the mains power supply enters a mains distribution box, where a part of the mains power supply is supplied to an air conditioner, lighting, and a common socket, and the other part is supplied to an uninterruptible power supply (UPS). As shown in FIG. 1, after the other part of the mains power supply which is output from a lower end of the UPS passes through a UPS output power distribution cabinet, power is supplied to each cabinet using front-end switches of the cabinet.

The front-end switches of the cabinet may be integrated into a power distribution cabinet, or may be distributed in independent plug-in units. The cabinet needs to acquire power from the front-end switch of the cabinet. However, because the front-end switch of the cabinet has a fixed switch capacity, power distribution to the cabinet is inflexible. In particular, when a capacity of the switch is unadaptable because of a power change of the cabinet, a switch and a power cable need to be replaced, and therefore, a large engineering workload is caused.

SUMMARY

Embodiments of the present disclosure provide a power supply control apparatus and a method for controlling power supply, which can adjust a capacity of a switch and enhance power distribution flexibility.

According to a first aspect, a power supply control apparatus is provided, where the power supply control apparatus is configured to control power supply to a cabinet in a data center and includes a communications module configured to receive an instruction of a network management center; and a controllable switch configured to adjust a capacity of the controllable switch according to the instruction to perform power-on/power-off control on the cabinet.

With reference to the first aspect, in a first possible implementation manner of the first aspect, the power supply control apparatus further includes a monitoring module, where the monitoring module is configured to monitor information about an inner electrical parameter of the cabinet; and the communications module is further configured to report the information about the electrical parameter to the network management center.

With reference to the first possible implementation manner of the first aspect, in a second possible implementation manner of the first aspect, the electrical parameter includes at least one of a current, a voltage, active power, reactive power, a quantity of electricity, a power factor, three-phase balance, and a waveform distortion rate.

With reference to the first aspect or any possible implementation manner of the foregoing first aspect, in a third possible implementation manner of the first aspect, the power supply control apparatus is a power distribution cabinet, and the power distribution cabinet is connected to the cabinet using a cable.

With reference to the first aspect or any possible implementation manner of the foregoing first aspect, in a fourth possible implementation manner of the first aspect, the power supply control apparatus further includes a collection module, where the collection module is configured to collect environment information of the cabinet; and the communications module is further configured to report the environment information to the network management center.

With reference to the fourth possible implementation manner of the first aspect, in a fifth possible implementation manner of the first aspect, the power supply control apparatus is a plug-in unit, and the plug-in unit acquires power from a UPS output power distribution cabinet using a busbar.

With reference to the first aspect or any possible implementation manner of the first aspect, in a sixth possible implementation manner of the first aspect, the environment information includes at least one of a temperature, a depth, a smoke sensor, and position information.

With reference to the first aspect or any possible implementation manner of the first aspect, in a seventh possible implementation manner of the first aspect, the power supply control apparatus further includes an auxiliary power source.

According to a second aspect, a method for controlling power supply to a cabinet in a data center is provided, including receiving an instruction of a network management center; and adjusting a capacity of a controllable switch according to the instruction to perform power-on/power-off control on the cabinet.

With reference to the second aspect, in a first possible implementation manner of the second aspect, the method further includes monitoring information about an inner electrical parameter of the cabinet; and reporting the information about the electrical parameter to the network management center.

With reference to the first possible implementation manner of the second aspect, in a second possible implementation manner of the second aspect, the electrical parameter includes at least one of a current, a voltage, active power, reactive power, a quantity of electricity, a power factor, three-phase balance, and a waveform distortion rate.

With reference to the second aspect or any possible implementation manner of the foregoing second aspect, in a third possible implementation manner of the second aspect, the method further includes collecting environment information of the cabinet; and reporting the environment information to the network management center.

With reference to the third possible implementation manner of the second aspect, in a fourth possible implementation manner of the second aspect, the environment information includes at least one of a temperature, a depth, a smoke sensor, and position information.

In the embodiments of the present disclosure, a power supply control apparatus may receive an instruction of a network management center, and can adjust a capacity of a controllable switch according to the instruction, which enhances power distribution flexibility, and therefore, a workload of changing a switch and a power cable can be reduced, and an engineering related risk can be avoided.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
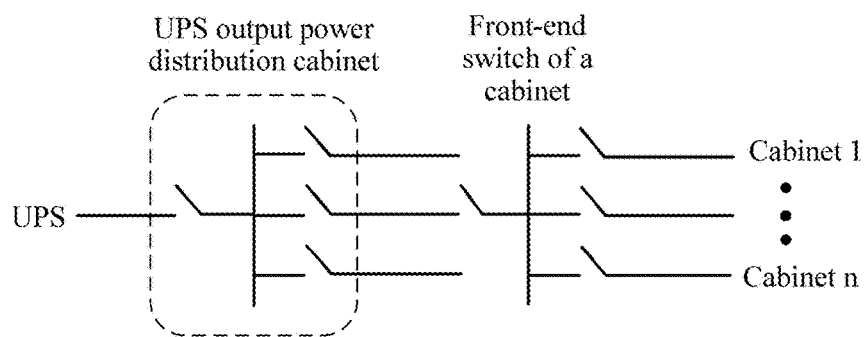
FIG. 1 is a schematic diagram of power supply to a cabinet in a data center.

FIG. 1 is a schematic diagram of power supply to a cabinet in a data center. Front-end switches of the cabinet may be integrated into a power distribution cabinet, or may be distributed in independent plug-in units.

Figure 2:
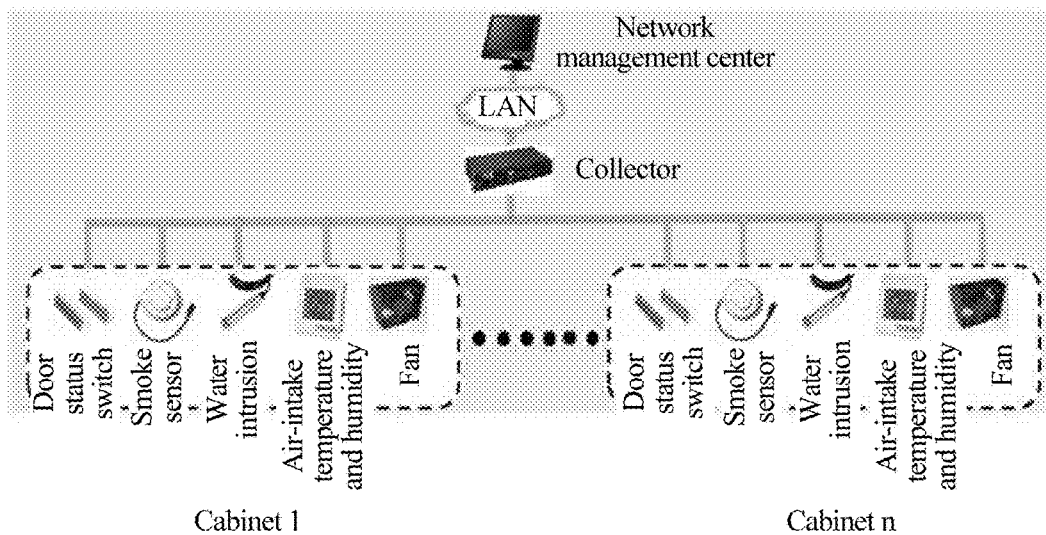
FIG. 2 is a schematic diagram of dynamic environment monitoring of an equipment room.

In addition, dynamic environment monitoring of an equipment room is another independent system. As shown in FIG. 2, the monitoring architecture is one or more collectors collect internal and external monitored parameters of multiple cabinets, and are then connected to a switch to report the monitored parameters to a network management center.

That is, for monitored parameters of an equipment room, after collecting all monitored parameters in a centralized manner, one or more collectors report all the monitored parameters. The collector needs to be connected to multiple monitoring components that vary in distance, and the connection is a wired connection, which leads to a large quantity of cables in wired connection engineering and complex cabling.

Figure 3:
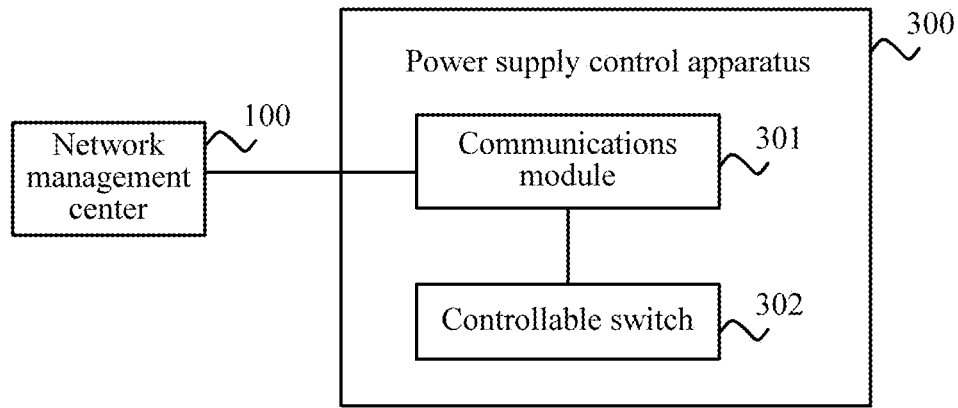
FIG. 3 is a block diagram of a power supply control apparatus according to an embodiment of the present disclosure.

FIG. 3 is a block diagram of a power supply control apparatus according to an embodiment of the present disclosure. The power supply control apparatus 300 shown in FIG. 3 may be configured to control power supply to a cabinet in a data center and the power supply control apparatus 300 includes a communications module 301 and a controllable switch 302.

The communications module 301 is configured to receive an instruction of a network management center 100. The controllable switch 302 is configured to adjust a capacity of the controllable switch according to the instruction to perform power-on/power-off control on the cabinet.

In this embodiment of the present disclosure, a power supply control apparatus may receive an instruction of a network management center, and can adjust a capacity of a controllable switch according to the instruction, which enhances power distribution flexibility, and can reduce a workload of replacing a switch and a power cable, thereby avoiding an engineering related risk.

It should be noted that in this embodiment of the present disclosure, the network management center may also be referred to as a network management center, a network management system, a network management unit, or the like, or may be referred to as network management for short, which is not limited in the present disclosure.

Optionally, the network management center may be a server of the data center, and may be manually configured, operated, and the like.

The communications module 301 may communicate with the network management center 100 in a wireless manner. In this case, connection is performed without a cable, which can reduce a quantity of cables.

In this embodiment of the present disclosure, a rated value of a capacity of an input switch of the cabinet may be set in the network management center 100, and the controllable switch 302 adjusts the capacity of the switch using the instruction passed through the communications module 301. In this way, a problem of a fixed capacity of a switch in the prior art can be resolved, and an adjustable capacity of the switch can be implemented, which enhances power distribution flexibility and avoids an engineering related risk.

For example, a rated power supply current of the cabinet may be set in the network management center 100, where the current may be of different values such as 10 amperes (A), 16A, 20A, 25A, 32A, 40A, 50A, and 63A. In this case, monitoring and control of power supply to an equipment room can be implemented by monitoring and controlling the power supply current of the cabinet in the network management center 100.

Therefore, in this embodiment of the present disclosure, the capacity and connection/disconnection that are of the controllable switch 302 are controlled using the communications module 301 in the network management center 100, which can easily implement power-on/power-off control on the cabinet.

Optionally, the power supply control apparatus 300 shown in FIG. 3 may further include a monitoring module. The monitoring module is configured to monitor information about an inner electrical parameter of the cabinet, and the communications module 301 is further configured to report the information about the electrical parameter to the network management center 100.

In this embodiment of the present disclosure, the monitoring module may be implemented in a form of a smart meter. For example, the monitored information about the electrical parameter may be presented on a display of the smart meter. The display may be in a form of a liquid crystal display (LCD), an organic light-emitting diode (OLED), or the like.

Alternatively, the monitoring module may be located inside an electrical parameter measuring instrument.

The electrical parameter includes at least one of a current, a voltage, active power, reactive power, a quantity of electricity, a power factor, three-phase balance, and a waveform distortion rate.

In this embodiment of the present disclosure, the monitoring module monitors the information about the electrical parameter, and reports the information about the electrical parameter to the network management center 100 using the communications module 301, so that the network management center 100 can learn a working status of the cabinet in a timely manner, and it is convenient for the network management center 100 to perform uniform management on the cabinet.

It can be learned that in this embodiment of the present disclosure, the network management center 100 can perform uniform management on power supply and monitoring of the cabinet, which can implement remote power-on/power-off control on the cabinet, and can configure and set power supply to the cabinet.

Figure 4:
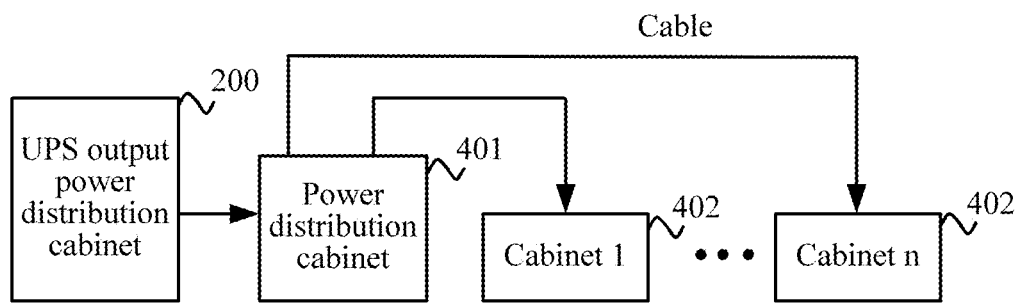
FIG. 4 is a schematic diagram of a scenario of a power supply control apparatus according to an embodiment of the present disclosure.

Optionally, as an embodiment, the power supply control apparatus 300 may be a power distribution cabinet. As shown in FIG. 4, a power distribution cabinet 401 may be connected to a cabinet 402 using a cable. The power distribution cabinet 401 may acquire power from a UPS output power distribution cabinet 200 and control power-on/power-off of the cabinet 402.

The power distribution cabinet 401 may also be referred to as an array power distribution cabinet.

It may be understood that the power distribution cabinet 401 may include multiple controllable switches 302, and the multiple controllable switches 302 respectively control power-on/power-off of multiple cabinets 402. In addition, a switch capacity and connection/disconnection of each controllable switch 302 may be controlled using the network management center 100.

Figure 5:
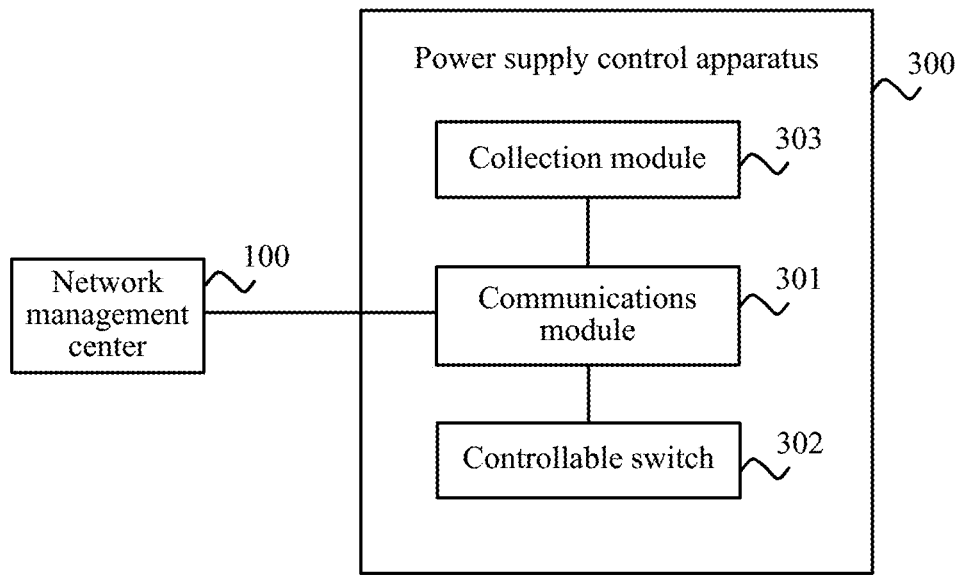
FIG. 5 is a block diagram of a power supply control apparatus according to another embodiment of the present disclosure.

Optionally, as another embodiment, as shown in FIG. 5, the power supply control apparatus 300 shown in FIG. 3 may further include a collection module 303. The collection module 303 is configured to collect environment information of the cabinet, and the communications module 301 is further configured to report the environment information to the network management center 100.

In this case, the network management center 100 can remotely acquire the environment information of the cabinet.

The collection module 303 may be connected to a sensor inside the cabinet to collect information about an internal environment of the cabinet, or the collection module 303 may be connected to an external monitoring part near the cabinet to collect information about an external environment of the cabinet.

It may be understood that in this embodiment of the present disclosure, the collection module 303 may be implemented in a form of a collector, and the collector may be the collector shown in FIG. 2.

It should be noted that in this embodiment of the present disclosure, the collector only needs to be connected to a sensor inside a single cabinet and several nearby external monitoring parts. In this way, cross-cabinet engineering cabling is basically not required, which can reduce a quantity of engineering cables, and cabling is simple.

The environment information includes at least one of a temperature, a depth, a smoke sensor, and position information.

Figure 6:
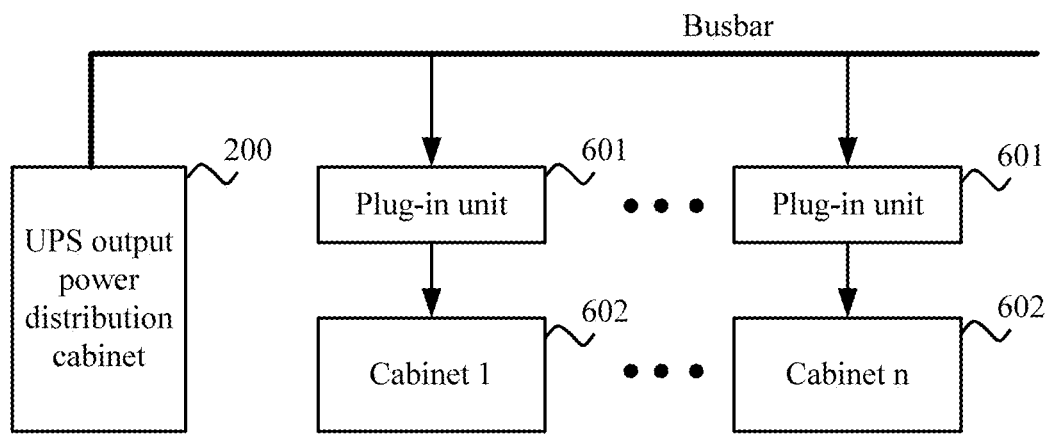
FIG. 6 is a schematic diagram of a scenario of a power supply control apparatus according to another embodiment of the present disclosure.

Optionally, the power supply control apparatus 300 shown in FIG. 5 may be a plug-in unit, where the plug-in unit may be mounted on the top of the cabinet or inside the cabinet. As an embodiment, as shown in FIG. 6, the plug-in unit 601 may acquire power from a UPS output power distribution cabinet 200 using a busbar and supply power to the cabinet.

Optionally, in this embodiment of the present disclosure, the power supply control apparatus 300 shown in FIG. 3 or FIG. 5 may further include an auxiliary power source.

Optionally, in this embodiment of the present disclosure, the power supply control apparatus 300 shown in FIG. 3 or FIG. 5 may further include a micro control unit (MCU). The MCU may also be referred to as a single-chip microcomputer (SCM), and may be used as a microprocessor of the power supply control apparatus 300.

It should be noted that in this embodiment of the present disclosure, the monitoring module and/or the collection module 303 may be integrated into a same processor with the MCU. The processor may be an integrated circuit chip, and has a signal processing capability. In an implementation process, the foregoing functions may be completed using an integrated logic circuit of hardware in the processor or an instruction in a form of software. The processor may be a general purpose processor, a digital signal processor (DSP), an application specific integrated circuit (ASIC), a field programmable gate array (FPGA), or another programmable logic component, a discrete gate, a transistor logic component, or a discrete hardware component. The general purpose processor may be a microprocessor or the processor may be any conventional processor or the like. A software module may be located in a mature storage medium in the field, such as a random access memory, a flash memory, a read-only memory, a programmable read-only memory, an electrically-erasable programmable memory, or a register. The storage medium is located in a memory, and the processor may read information in the memory and implement the above-described functions in combination with hardware of the processor.

It may be understood that the power supply control apparatus 300 may further include the memory configured to store the information that is about the electrical parameter and that is monitored by the monitoring module, and further configured to store the environment information that is of the cabinet and that is collected by the collection module 303.

In addition, the memory may also store a software instruction, and the like.

It may be understood that in this embodiment of the present disclosure, the memory may be a volatile memory or a nonvolatile memory, or may include both of the volatile memory and the nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and the random access memory is used as an external cache. For example, the RAM may be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous-link dynamic random access memory (SLDRAM), and a direct memory bus random access memory (DR RAM). The memory in this embodiment of the present disclosure includes but is not limited to these memories and memories of any other proper types.

Figure 7:
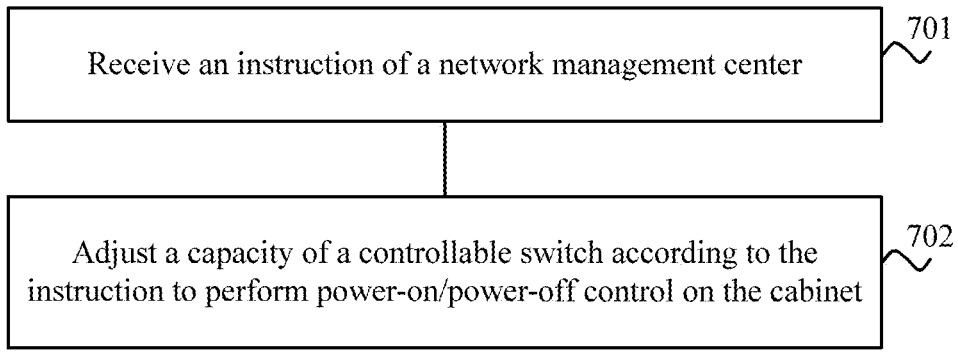
FIG. 7 is a schematic flowchart of a method for controlling power supply to a cabinet in a data center according to an embodiment of the present disclosure.

FIG. 7 is a schematic flowchart of a method for controlling power supply to a cabinet in a data center according to an embodiment of the present disclosure. The method shown in FIG. 7 may be executed by the foregoing power supply control apparatus 300. The method includes the following steps.

Step 701. Receive an instruction of a network management center.

Step 702. Adjust a capacity of a controllable switch according to the instruction to perform power-on/power-off control on the cabinet.

In this embodiment of the present disclosure, a power supply control apparatus may receive an instruction of a network management center, and can adjust a capacity of a controllable switch according to the instruction, which enhances power distribution flexibility, and therefore, a workload of changing a switch and a power cable can be reduced, and an engineering related risk can be avoided.

It should be noted that in this embodiment of the present disclosure, the network management center may also be referred to as a network management center, a network management system, a network management unit, or the like, or may be referred to as network management for short, which is not limited in the present disclosure.

Optionally, the network management center may be a server of the data center, and may be manually configured, operated, and the like.

In this embodiment of the present disclosure, a rated value of a capacity of an input switch of the cabinet may be set in the network management center, and the power supply control apparatus adjusts the capacity of the switch using the instruction. In this way, a problem of a fixed capacity of the switch in the prior art can be resolved, and an adjustable capacity of the switch can be implemented, which enhances power distribution flexibility and avoids an engineering related risk.

For example, a rated power supply current of the cabinet may be set in the network management center, where the current may be of different values such as 10A, 16A, 20A, 25A, 32A, 40A, 50A, and 63A. In this case, monitoring and control of power supply to an equipment room can be implemented by monitoring and controlling the power supply current of the cabinet in the network management center.

Optionally, as an embodiment, the method shown in FIG. 7 may further include monitoring information about an inner electrical parameter of the cabinet; and reporting the information about the electrical parameter to the network management center.

The electrical parameter includes at least one of a current, a voltage, active power, reactive power, a quantity of electricity, a power factor, three-phase balance, and a waveform distortion rate.

In this case, in this embodiment of the present disclosure, the network management center can perform uniform management on power supply and monitoring of the cabinet, which can implement remote power-on/power-off control on the cabinet, and can configure and set power supply to the cabinet.

Optionally, as another embodiment, the method shown in FIG. 7 may further include collecting environment information of the cabinet; and reporting the environment information to the network management center.

The environment information includes at least one of a temperature, a depth, a smoke sensor, and position information.

In this case, the network management center can remotely acquire the environment information of the cabinet.

The method shown in FIG. 7 may be executed by the power supply control apparatus 300 in the foregoing embodiment. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A power supply control apparatus configured to control power supply to a cabinet in a data center, the power supply control apparatus comprising:
   a communication module configured to receive an instruction from a network management center; and
   a controllable switch coupled to the communication module, the controllable switch comprising a plurality of front-end switches, each front-end switch having a rated value, and the controllable switch is configured to:
      use the instruction to select a front-end switch of the plurality of front-end switches based on the rated value of the front-end switch; and
      selectively control the power supply to the cabinet responsive to providing the power supply to the front-end switch.

2. The power supply control apparatus of claim 1, further comprising a monitoring module, the monitoring module being configured to monitor information about an inner electrical parameter of the cabinet, and the communication module is further configured to report the information monitored about the inner electrical parameter to the network management center.

3. The power supply control apparatus of claim 2, wherein the inner electrical parameter comprises at least one or more of a current, a voltage, active power, reactive power, a quantity of electricity, a power factor, three-phase balance, or a waveform distortion rate.

4. The power supply control apparatus of claim 1, wherein the power supply control apparatus is a power distribution cabinet, the power distribution cabinet being coupled to the cabinet using a cable and being configured to control a quantity of rated power supply current delivered to the cabinet using the front-end switch.

5. The power supply control apparatus of claim 1, further comprising a collection module, the collection module being further configured to collect environment information of the cabinet, and the communication module being further configured to report the environment information to the network management center.

6. The power supply control apparatus of claim 5, wherein the power supply control apparatus is a plug-in unit, the plug-in unit being configured to acquire power from an uninterruptible power supply (UPS) output power distribution cabinet by using a busbar.

7. The power supply control apparatus of claim 5, wherein the environment information comprises at least one of temperature information, depth information, smoke information, or position information.

8. The power supply control apparatus of claim 1, further comprising an auxiliary power source.

9. A method for controlling power supply to a cabinet in a data center, comprising:
   receiving, with a communication module, an instruction from a network management center; and
   selecting, with a controllable switch according to the instruction, a front-end switch of a plurality of front-end switches based on a rated value of a capacity of the front-end switch;
   supplying power to the front-end switch in response to selecting the front-end switch of the plurality of front-end switches; and
   selectively controlling power-on of the cabinet responsive to supplying the power to the front-end switch.

10. The method of claim 9, further comprising:
    monitoring information about an inner electrical parameter of the cabinet; and
    reporting information about the inner electrical parameter to the network management center.

11. The method of claim 9, further comprising:
    collecting environment information of the cabinet; and
    reporting the environment information to the network management center.

* * * * *